(12) United States Patent
Cha et al.

(10) Patent No.: US 11,110,841 B2
(45) Date of Patent: Sep. 7, 2021

(54) RETRACTABLE TABLE

(71) Applicants: Hyundai Motor Company, Seoul (KR); Kia Motors Corporation, Seoul (KR)

(72) Inventors: Dong Eun Cha, Hwaseong-Si (KR); Jin Ho Hwang, Cheonan-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/855,852

(22) Filed: Apr. 22, 2020

(65) Prior Publication Data

US 2021/0178949 A1 Jun. 17, 2021

(30) Foreign Application Priority Data

Dec. 11, 2019 (KR) .......................... 10-2019-0165129

(51) Int. Cl.
| | |
|---|---|
| *B60N 3/00* | (2006.01) |
| *B60N 2/75* | (2018.01) |
| *A47B 13/08* | (2006.01) |
| *A47B 3/00* | (2006.01) |

(52) U.S. Cl.
CPC ............... *B60N 3/002* (2013.01); *A47B 3/00* (2013.01); *A47B 13/088* (2013.01); *B60N 2/79* (2018.02)

(58) Field of Classification Search
CPC .......... B60N 3/002; B60N 3/004; B60N 2/79; A47B 3/00; A47B 3/04; A47B 13/088; A47B 1/06

USPC ............................................ 108/67; 297/145
See application file for complete search history.

(56) References Cited

U.S. PATENT DOCUMENTS

| | | | | |
|---|---|---|---|---|
| 323,520 | A * | 8/1885 | Neumer et al. .......... | A47B 1/06 108/68 |
| 1,566,200 | A * | 12/1925 | Giard ...................... | A47B 3/04 108/93 |
| 1,829,590 | A * | 10/1931 | Giard ...................... | A47B 1/06 108/68 |
| 2,726,911 | A * | 12/1955 | Mason .................... | A47B 1/06 108/93 |
| 2,848,291 | A * | 8/1958 | Edelson ............... | A47B 17/033 108/93 |

(Continued)

FOREIGN PATENT DOCUMENTS

| | | | | |
|---|---|---|---|---|
| DE | | 19935762 A1 * | 2/2001 | ............... A47B 3/12 |
| DE | 102017211572 A1 * | 8/2018 | ........... B60N 2/0232 |

(Continued)

*Primary Examiner* — Jose V Chen
(74) *Attorney, Agent, or Firm* — Morgan, Lewis & Bockius LLP

(57) ABSTRACT

A retractable table may include a table body wound around the retraction mechanism in the housing when accommodated and drawn out and unfolded to the outside of the housing through the accommodation hole when drawn out, and a support mechanism provided at a side end portion of the table body, including a plurality of pieces, each of which is folded to overlap the table body or unfolded from the table body, and including magnetic bodies provided on the pieces to provide rigidity such that, when the table body is deployed, the pieces are connected to each other through the magnetic bodies to maintain the deployed state of the table body.

15 Claims, 6 Drawing Sheets

(56) References Cited

U.S. PATENT DOCUMENTS

| | | | | |
|---|---|---|---|---|
| 3,630,156 | A * | 12/1971 | Woodruff | A47B 3/04 |
| | | | | 108/34 |
| 3,645,597 | A * | 2/1972 | Sakow | A47B 29/00 |
| | | | | 312/297 |
| 3,770,106 | A * | 11/1973 | Kuehl | B65G 17/067 |
| | | | | 198/793 |
| 3,896,742 | A * | 7/1975 | Ferraro | B60R 5/04 |
| | | | | 108/44 |
| 4,944,552 | A * | 7/1990 | Harris | A47C 7/70 |
| | | | | 297/145 |
| 5,547,247 | A * | 8/1996 | Dixon | A47C 7/70 |
| | | | | 297/145 |
| 6,347,590 | B1 * | 2/2002 | D'Annunzio | B60N 3/002 |
| | | | | 108/25 |
| 7,798,072 | B2 * | 9/2010 | Becker | B60N 3/002 |
| | | | | 108/42 |
| 2016/0331125 | A1 * | 11/2016 | Banks | A47B 5/00 |
| 2018/0177298 | A1 * | 6/2018 | Farahani | A47B 23/02 |
| 2019/0031069 | A1 * | 1/2019 | Pitcole | B60N 3/004 |
| 2020/0214438 | A1 * | 7/2020 | Vandewall | A47B 13/081 |

FOREIGN PATENT DOCUMENTS

| | | | | |
|---|---|---|---|---|
| EP | 1607022 | A1 * | 12/2005 | A47B 3/04 |
| JP | S61-020438 | U | 6/1986 | |
| KR | 20-1997-0001054 | Y1 | 1/1997 | |
| KR | 20-2013-0001825 | U | 3/2013 | |
| KR | 10-1593816 | B1 | 2/2016 | |
| KR | 20-0484376 | Y1 | 8/2017 | |

* cited by examiner

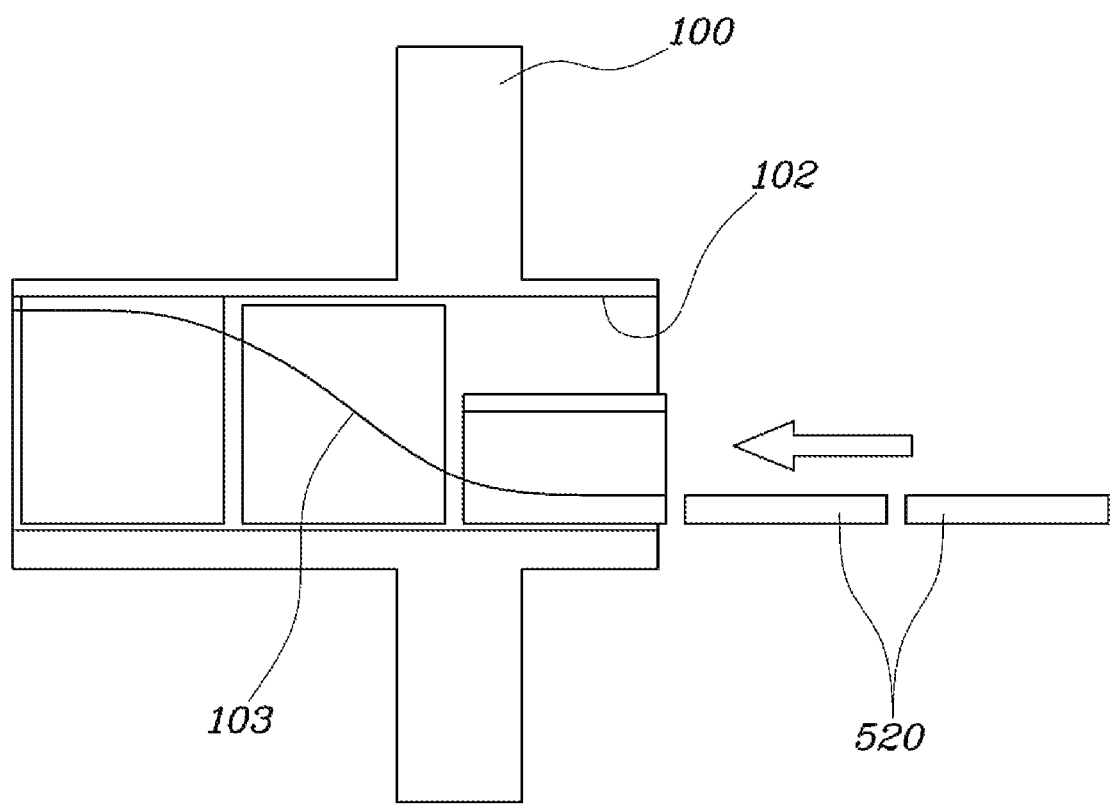

RETRACTABLE TABLE

CROSS REFERENCE TO RELATED APPLICATION

The present application claims priority to Korean Patent Application No. 10-2019-0165129 filed on Dec. 11, 2019, the entire contents of which is incorporated herein for all purposes by this reference.

BACKGROUND OF THE INVENTION

Field of the Invention

The present invention relates to a retractable table which is mounted in a seat armrest of a vehicle and is capable of being drawn out when used and is capable of being accommodated if not used.

Description of Related Art

An armrest is mounted in a seat of a vehicle. Recently, a table is mounted in the armrest of the seat according to the enhancement and autonomous driving of the vehicle.

However, since the table mounted in the vehicle may secure a safe attitude and balance even while driving, a material having high rigidity is employed so that, when the table is not used, a structure and a space which are capable of storing the table are required, the table inevitably occupies a large space and weights a lot.

However, in terms of weight reduction of the vehicle, the table needs to be lightweight, and in particular, when the table is accommodated to secure an internal space, there is a continuous need to minimize a space occupied by the table.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a retractable table which is mounted in a seat armrest of a vehicle and is configured for being drawn out when used and is configured for being accommodated if not used.

According to one aspect, there is provided a retractable table including a housing in which a retraction mechanism is embedded and an accommodation hole is formed in a lateral direction of the housing, a table body wound around the retraction mechanism in the housing when accommodated and drawn out and unfolded to the outside of the housing through the accommodation hole when drawn out, and a support mechanism provided at a side end portion of the table body, including a plurality of pieces, each of which is folded to overlap the table body or unfolded from the table body, and including magnetic bodies provided on the pieces to provide rigidity such that, when the table body is deployed, the pieces are connected to each other through the magnetic bodies to maintain the deployed state of the table body.

The table body may be configured such that a plurality of blades are continuously connected, and the blades are flexibly connected to each other to be folded or unfolded so that, when the table body is accommodated in the housing, the blades may be wound and accommodated by the retraction mechanism.

The support mechanism may be provided at each of both side ends of the table body.

The table body may be configured such that a plurality of blades are continuously connected, and the blades are flexibly connected to each other to be folded or unfolded, and the piece of the support mechanism may be connected to correspond to a side end portion of the blade.

An upper end portion of the piece of the support mechanism may be pivotably connected to a side end portion of the table body, and when the table body is accommodated, the piece may be brought into close contact with a lower surface of the table body, and when the table body is drawn out, the piece may be pivoted downward to form an angle intersecting with the table body.

The magnetic bodies may be provided at side end portions of the pieces of the support mechanism, and when the table body is drawn out, side end portions of adjacent pieces may be fixed to each other due to a magnetic force.

The magnetic body may be provided to protrude from one side end portion of the piece and an insertion groove may be formed on the other side end portion thereof, and a protruding portion of the magnetic body of the piece may be inserted into the insertion groove, and when the pieces are coupled to each other due to a magnetic force, rigidity supporting the table body may be provided.

An accommodation hole of the housing may have a shape corresponding to a cross section of the table body and include a main hole portion extending in a width direction and a piece hole portion which extends from a side end portion of the main hole portion and in which the pieces of the support mechanism are accommodated.

A guide protrusion may be formed in the housing toward the piece hole portion, and when the table body is accommodated, the pieces of the support mechanism may collide with the guide protrusion, may be guided to the lower surface of the table body, and may be sequentially folded to the lower surface of the table body.

an external surface of the guide protrusion facing the piece hole portion may be formed of an inclined surface or a curved surface and be naturally raised as an edge portion of a lower end portion of the piece inserting into the piece hole portion is configured to be brought into contact with the external surface of the guide protrusion so that the piece may be pivoted and guided to be folded to the lower surface of the table body.

The housing may be an armrest of the seat.

The housing may be connected to the seat through a support and slides on the support in a front and rear direction thereof.

An upper end portion of the support may be hinged to the housing and a lower end portion thereof may be hinged to the seat so that the housing may ascend or descend according to pivoting of the support.

The seat may be a vehicle seat provided in an interior of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4, FIG. 5, FIG. 6, FIG. 7 and FIG. 8 are diagram illustrating an operating process of a support mechanism of the retractable table shown in FIG. 2.

Figure 1:
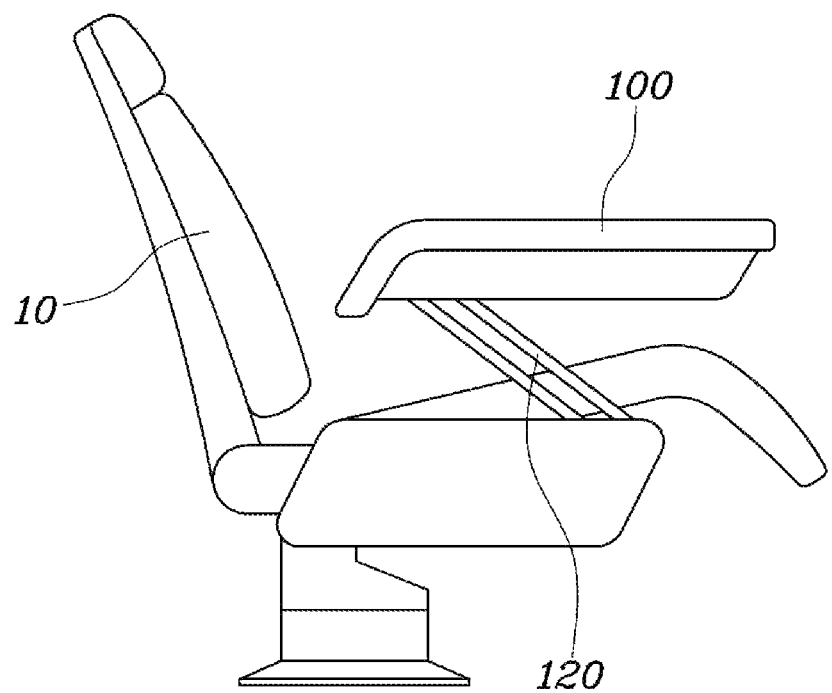
FIG. 1 is a diagram illustrating a seat of a vehicle in which a retractable table is mounted according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is intended to cover not only the exemplary embodiments of the present invention, but also various alternatives, modifications, equivalents and other embodiments, which may be included within the spirit and scope of the present invention as defined by the appended claims.

Figure 2:
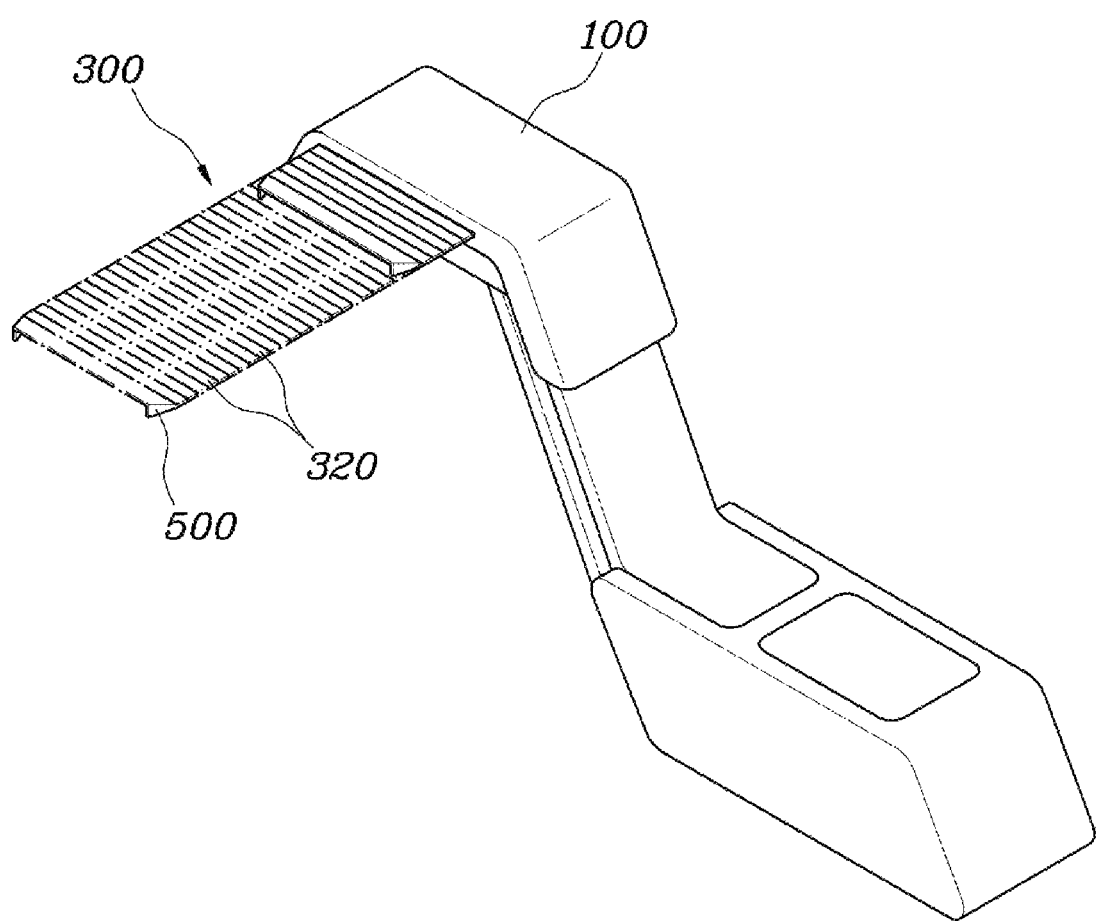
FIG. 2 is a diagram illustrating a state in which the retractable table is deployed according to an exemplary embodiment of the present invention.
Figure 3:
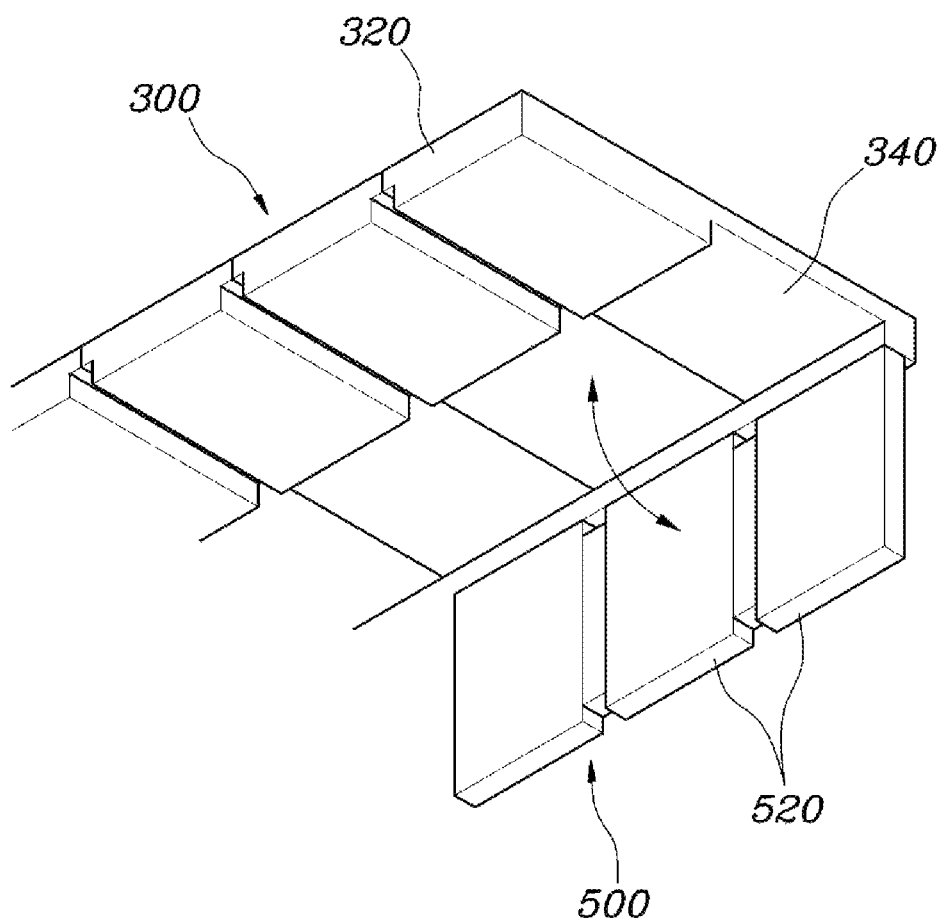
FIG. 3 is a detailed structural diagram of the retractable table shown in FIG. 2.
Figure 4:
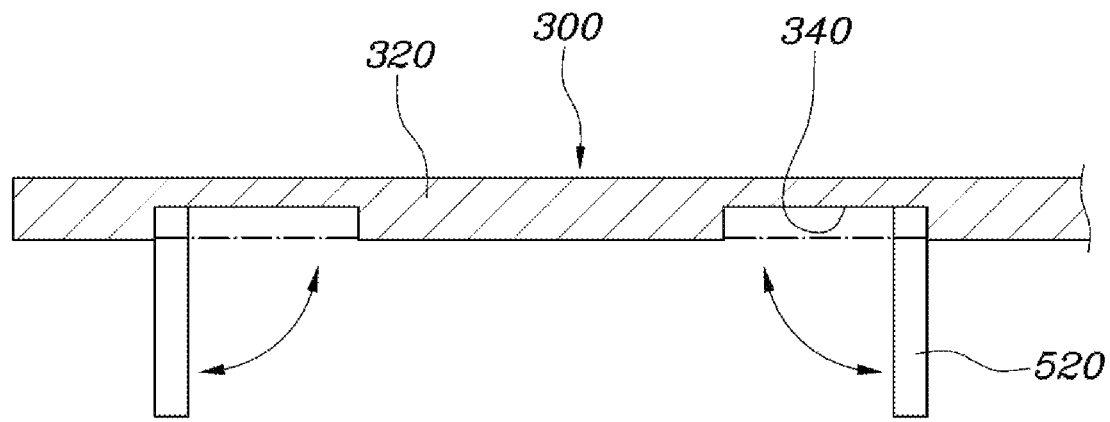
Figure 5:
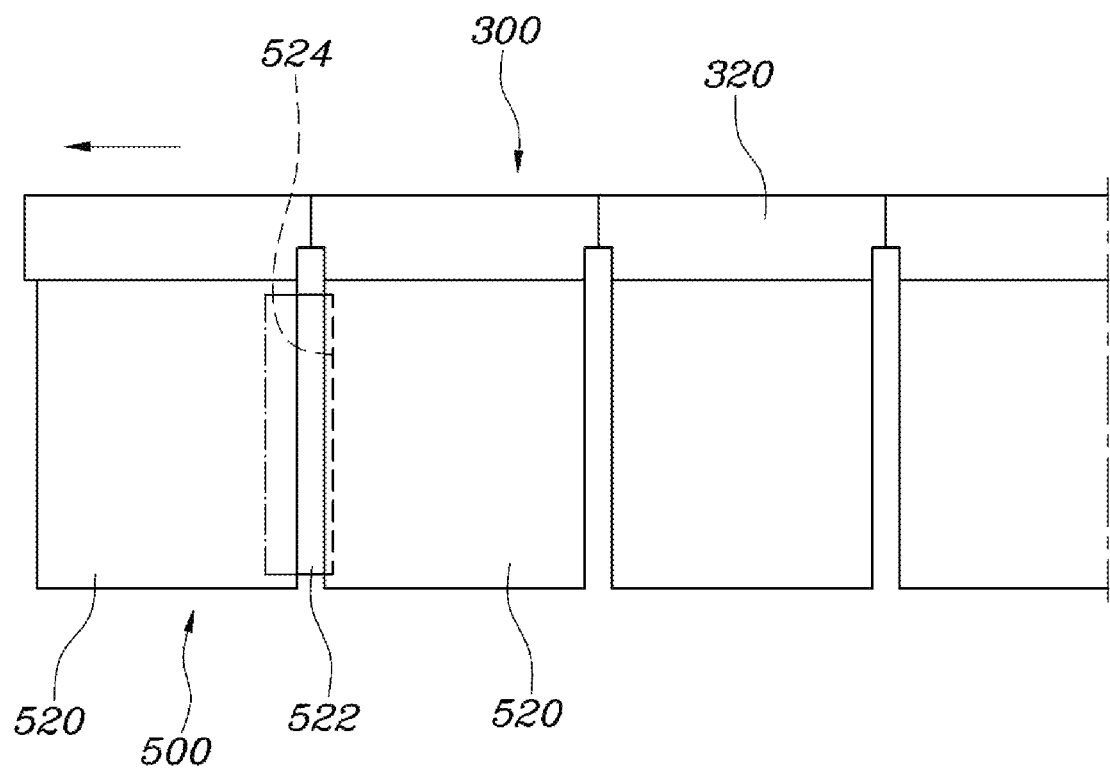
Figure 6:
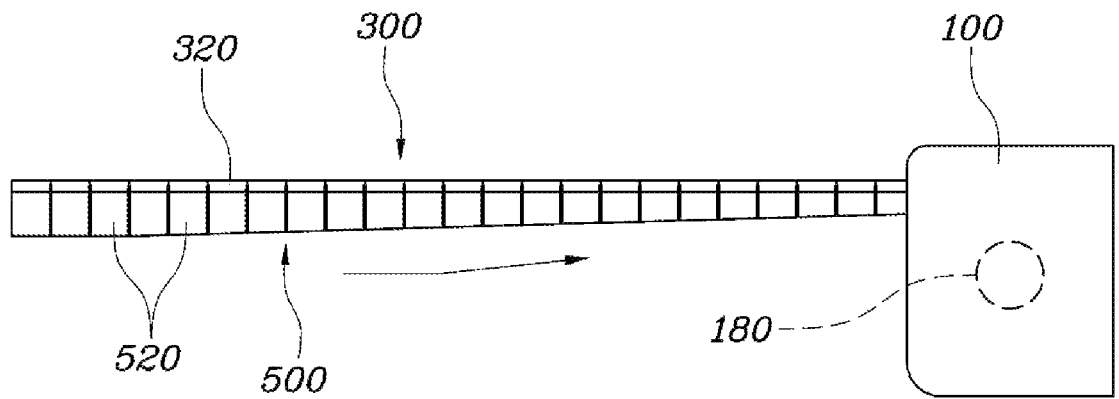
Figure 7:
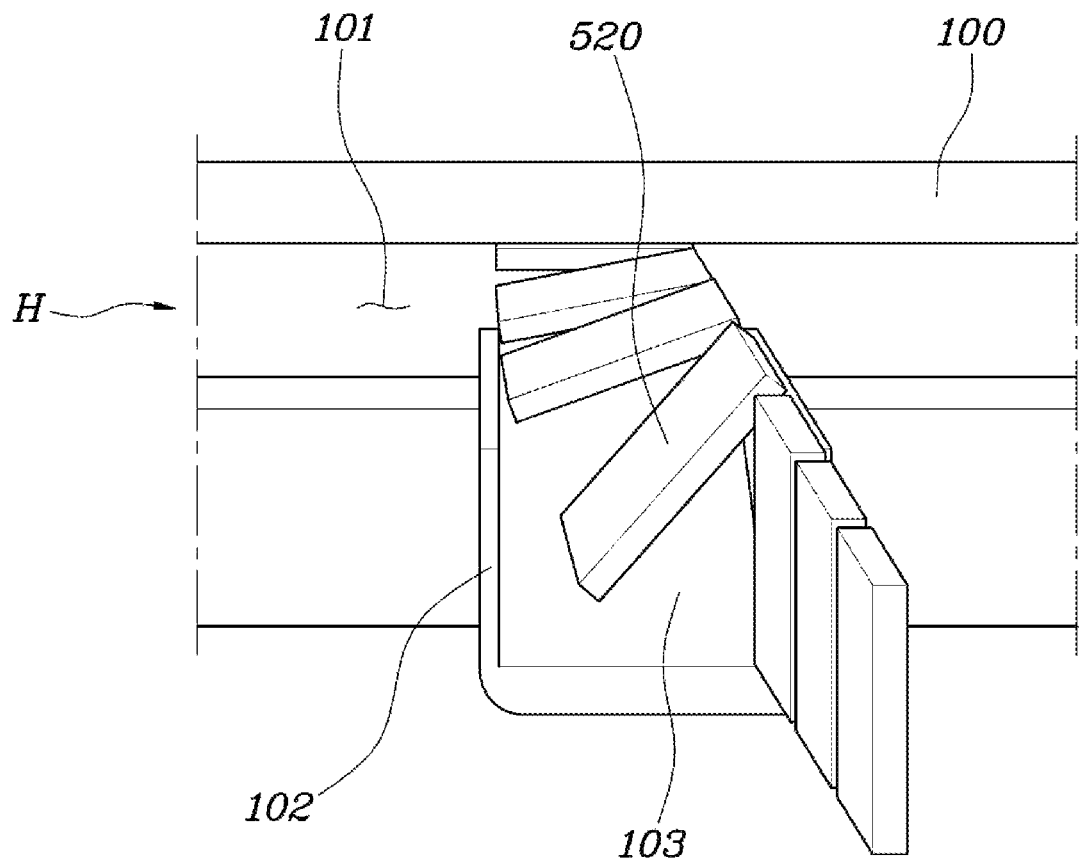

FIG. 1 is a diagram illustrating a seat of a vehicle in which a retractable table is mounted according to an exemplary embodiment of the present invention, FIG. 2 is a diagram illustrating a state in which the retractable table is deployed according to an exemplary embodiment of the present invention, FIG. 3 is a detailed structural diagram of the retractable table shown in FIG. 2, and FIG. 4, FIG. 5, FIG. 6, FIG. 7 and FIG. 8 are diagram illustrating an operating process of a support mechanism of the retractable table shown in FIG. 2.

FIG. 1 is a diagram illustrating the seat of the vehicle in which the retractable table is mounted according to an exemplary embodiment of the present invention. The retractable table of the present invention is a table of a type which is rolled upwards to be accommodated or is unwound to be unfolded and deployed. Furthermore, the table may be used in various fields and may be typically useful when mounted in an armrest of a vehicle.

Recently, as an autonomous driving vehicle is expanded, utilization of a seat 10 becomes very high, and accordingly, the seat 10 is useful for a driver to get out of the driving and work at the table. In the case of such a vehicle, as shown in FIG. 1, an armrest is provided in the seat 10. Furthermore, a housing 100 in which the table of the present invention is accommodated is configured as the armrest. In the instant case, a user may deploy the armrest to hang an arm and may also use the table by deploying the table from the armrest. That is, the housing 100 in an exemplary embodiment of the present invention may be the armrest of the seat 10.

Furthermore, the housing 100 may be connected to the seat 10 through a support 120 and may slide on the support 120 in a front and rear direction thereof. Furthermore, an upper end portion of the support 120 is hinged to the housing 100 and a lower end portion thereof is hinged to the seat 10 so that the housing 100 may ascend or descend according to pivoting of the support 120. Consequently, not only a position of the armrest but also a position of the table may be adjusted according to a position of an arm or hand of the user.

Meanwhile, FIG. 2 is a diagram illustrating a state in which the retractable table is deployed according to an exemplary embodiment of the present invention, FIG. 3 is a detailed structural diagram of the retractable table shown in FIG. 2, and FIG. 4, FIG. 5, FIG. 6, FIG. 7 and FIG. 8 are diagram illustrating an operating process of a support mechanism of the retractable table shown in FIG. 2.

The retractable table according to an exemplary embodiment of the present invention may include a housing 100 in which a retraction mechanism 180 is embedded and an accommodation hole H is formed in a lateral direction thereof, a table body 300 wound around the retraction mechanism 180 in the housing 100 when accommodated and drawn out and deployed to the outside of the housing 100 through the accommodation hole H when drawn out, and a support mechanism 500 provided at a side end portion of the table body 300, including a plurality of pieces 520, each of which is folded to overlap the table body 300 or unfolded from the table body 300, and including magnetic bodies 522 provided on the pieces 520 to provide rigidity such that, when the table body 300 is deployed, the pieces 520 are connected to each other through the magnetic bodies 522 to maintain the deployed state of the table body 300.

That is, an internal space is provided in the housing 100 in an exemplary embodiment of the present invention provided as the armrest, and the retraction mechanism 180 is provided in the internal space. The retraction mechanism 180 has a cylindrical shape and is provided in the housing 100 through a spring or the like to wind the table with a rotating force of the spring to be accommodated. The retraction mechanism 180 employs a structural principle of a webbing of a conventional vehicle seat belt, and thus a detailed description thereof will be omitted herein.

Meanwhile, since the table body 300 in an exemplary embodiment of the present invention is accommodated while being wound or is deployed while being unfolded, the table body 300 does not occupy a separate space when accommodated and is accommodated in the armrest so that space utilization is increased. Furthermore, since a position of the table is also adjusted by adjusting a position of the armrest, a separate portion may be omitted, an operation is simplified, and convenience of the use is increased.

Since the table body 300 is formed in a structure of having flexibility to be wound and unfolded, it is difficult to secure rigidity when the table body 300 is deployed. To this end, according to an exemplary embodiment of the present invention, when the table body 300 is deployed, rigidity is provided to the table body 300 using the support mechanism 500 so that the user is not inconvenient to use the retractable table, and the support mechanism 500 has a form in which the plurality of pieces 520 are connected and connects the pieces 520 using the magnetic bodies 522. When the support mechanism 500 is deployed, the pieces 520 are bound to serve as one support, and when the support mechanism 500 is accommodated, the pieces 520 are separated from each other to be accommodated together with the table body 300.

Consequently, flexibility of the table body 300 is secured to minimize an accommodation space, and when the table body 300 is used, rigidity is provided to the table body 300 to definitely serve as a table.

The table body 300 is configured such that a plurality of blades 320 are continuously connected, and the blades 320 are connected to each other with flexibility to be folded or unfolded so that, when the table body 300 is accommodated in the housing 100, the blades 320 may be wound and accommodated by the retraction mechanism 180. That is, the table body 300 includes the plurality of blades 320, each of the blades 320 has a shape extending in a width direction of the table, and the blades 320 have a shape connected to each other by hinge pins or a shape connected by a flexible material such that an operation in which the table body 300 is wound around the retraction mechanism 180 is possible.

The support mechanism 500 may be provided at each of both side end portions of the table body 300. The table body 300 is configured such that the plurality of blades 320 are continuously connected, and the blades 320 are connected to each other with flexibility to be folded or unfolded, and the pieces 520 of the support mechanism 500 may be connected to correspond to side end portions of the blades 320. That is, when the piece 520 is hinged to the side end portion of the blade 320 and accommodated, the piece 520 is configured to be pivoted to be brought into close contact with a lower end portion of the blade 320 so that the piece 520 is wound together with the blade 320.

Therefore, since an upper end portion of the piece 520 of the support mechanism 500 is pivotably connected to the side end portion of the table body 300, when the table body 300 is accommodated, the piece 520 may be brought into close contact with a lower surface of the table body 300, when the table body 300 is drawn out, the piece 520 may be pivoted downward to form an angle intersecting with the table body 300.

Furthermore, the magnetic bodies 522 may be provided at side end portions of the pieces 520 of the support mechanism 500, and when the table body 300 is drawn out, side end portions of adjacent pieces 520 may be fixed to each other due to a magnetic force, since the magnetic body 522 is provided to protrude from one end portion of the piece 520 and an insertion groove 524 is formed on the other end portion thereof, a protruding portion of the magnetic body 522 of the piece 520 may be inserted into the insertion groove 524, and when the pieces 520 are coupled to each other due to a magnetic force, rigidity supporting the table body 300 may be provided.

Consequently, when the table body 300 is deployed, each of the pieces 520 is configured to be pivoted downward due to gravity, and simultaneously, the magnetic body 522 of the piece 520 is inserted the insertion groove 524 at a side of an adjacent piece 520 and fixed to the adjacent piece 520. Naturally, another magnetic body 522 or a structure including a metal material, which is couplable to the magnetic body 522 through a magnetic force, may be embedded in the insertion groove 524 of the adjacent piece 520. According to the above process, the pieces 520 are coupled to each other through the magnetic force and hook-coupled through a groove structure to finally serve as one support. With the above role of the support mechanism 500, in a state in which the table is deployed, the support mechanism 500 is not flexible and securely supported on a skeleton to serve as a table.

Meanwhile, the accommodation hole H of the housing 100 may have a shape corresponding to a cross section of the table body 300 and extend from a side end portion of the main hole portion 101 extending in a width direction to form a piece hole portion 102 in which the pieces 520 of the support mechanism 500 are accommodated.

Furthermore, a guide protrusion 103 is formed in the housing toward the piece hole portion 102, and when the table body 300 is accommodated, the pieces 520 of the support mechanism 500 may collide with the guide protrusion 103, may be guided to the lower surface of the table body 300, and may be sequentially folded to the lower surface of the table body 300.

An external surface of the guide protrusion 103 facing the piece hole portion 102 is formed of an inclined surface or a curved surface and is naturally raised as an edge portion of a lower end portion of the piece 520 inserting into the piece hole portion 102 is configured to be brought into contact with the external surface of the guide protrusion 103 so that the piece 520 is configured to be pivoted and guided to be folded to the lower surface of the table body 300.

That is, when the table is accommodated, the piece 520 is inserted into the piece hole portion 102, the edge portion of the lower end portion of the piece 520 is configured to be brought into contact with the external surface of the guide protrusion 103, and the table is further accommodated so that the piece 520 is guided by the guide protrusion 103 to be pivoted and raised. At the present moment, the piece 520 is raised as overcoming a magnetic force of an adjacent piece, and finally the pieces 520 are separated from each other and brought into close contact with the lower surface of the table body 300. Furthermore, the pieces 520 are wound around and accommodated in the retraction mechanism 180 together with the table body 300.

On the other hand, when the table is deployed, the piece 520 is released from the piece hole portion 102 together with the guide protrusion 103, pivoted downward due to gravity, and coupled to an adjacent piece 520, provided as a support.

Furthermore, when the lower end portion of the piece 520 is formed to have a streamlined line having a curvature, accommodation of the piece 520 by the guide protrusion 103 is easier.

Therefore, according to a retractable table of the present invention, the retractable table which is mounted in a seat armrest of a vehicle and is configured for being drawn out when used and is configured for being accommodated if not used may be provided.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A retractable table, comprising:
a housing, wherein a retraction mechanism is mounted in the housing and wherein the housing includes an accommodation hole formed in a lateral direction of the housing;
a table body engaged to and selectively woundable around the retraction mechanism through the accommodation hole of the housing, wherein the table body is wound around the retraction mechanism in the housing when accommodated in the housing and drawn out and unfolded to an outside of the housing through the accommodation hole when drawn out of the housing; and
a support mechanism mounted at a side end portion of the table body,
wherein the support mechanism includes:
a plurality of pieces, each of which is selectively foldable to the table body so that the plurality of pieces is folded to overlap the table body or unfolded from the table body, and
magnetic bodies mounted on the plurality of pieces so that the plurality of pieces is connected to each other through the magnetic bodies,
wherein, when the table body is deployed, the plurality of pieces and the magnetic bodies maintain a deployed state of the table body while the plurality of pieces is connected to each other through the magnetic bodies.

2. The retractable table of claim 1,
wherein the table body includes a plurality of blades continuously connected to each other, and
wherein the plurality of blades is flexibly connected to each other to be folded or unfolded so that, when the table body is accommodated in the housing, the plurality of blades is wound and accommodated by the retraction mechanism.

3. The retractable table of claim 1, wherein the support mechanism is mounted at each of first and second side end portions of the table body.

4. The retractable table of claim 1,
wherein the table body includes a plurality of blades continuously connected to each other, and
wherein the plurality of blades is flexibly connected to each other to be folded or unfolded, and the plurality of pieces is configured to be connected to correspond to a side end portion of the plurality of blades.

5. The retractable table of claim 1,
wherein an upper end portion of each of the plurality of pieces is pivotably connected to the side end portion of the table body such that the plurality of pieces is pivoted with respect to the side end portion of the table body when the table body is accommodated in or drawn out of the housing.

6. The retractable table of claim 5, wherein when the table body is accommodated in the housing, the plurality of pieces is configured to be brought into contact with a lower surface of the table body, and when the table body is drawn out of the housing, the plurality of pieces is configured to be pivoted downward from the lower surface of the table body to form an angle intersecting with the table body.

7. The retractable table of claim 1, wherein the magnetic bodies are mounted at side end portions of the plurality of pieces, and when the table body is drawn out of the housing, side end portions of adjacent pieces among the plurality of pieces are fixed to each other due to a magnetic force.

8. The retractable table of claim 7,
wherein the magnetic bodies are mounted to protrude from a first side end portion of the plurality of pieces and an insertion groove is formed on a second side end portion thereof, and
wherein a protruding portion of the magnetic bodies is configured to be inserted into the insertion groove and the plurality of pieces is coupled to each other due to a magnetic force of the magnetic bodies.

9. The retractable table of claim 1,
wherein the housing includes the accommodation hole formed in a shape corresponding to a cross section of the table body, and
wherein the accommodation hole includes a main hole portion extending in a width direction and a piece hole portion which extends from a side end portion of the main hole portion and in which the plurality of pieces of the support mechanism is configured to be accommodated in the piece hole portion.

10. The retractable table of claim 9, wherein a guide protrusion is formed in the housing toward the piece hole portion, and when the table body is accommodated in the housing, each of the plurality of pieces of the support mechanism sequentially collides with the guide protrusion, is then guided to a lower surface of the table body, and is sequentially folded to the lower surface of the table body.

11. The retractable table of claim 10, wherein an external surface of the guide protrusion facing the piece hole portion includes an inclined surface or a curved surface and is raised as an edge portion of a lower end portion of the plurality of pieces inserting into the piece hole portion is brought into contact with the external surface of the guide protrusion so that the plurality of pieces is configured to be pivoted and guided to be folded to the lower surface of the table body.

12. The retractable table of claim 1, wherein the housing is an armrest of a seat.

13. The retractable table of claim 12, wherein the housing is connected to the seat through a support and slides on the support in a predetermined direction thereof.

14. The retractable table of claim 13, wherein an upper end portion of the support is hinged to the housing and a lower end portion of the support is hinged to the seat so that the housing is configured to ascend or descend according to pivoting of the support.

15. The retractable table of claim 12, wherein the seat is a vehicle seat mounted in an interior of the vehicle.

* * * * *